United States Patent [19]

Delassaux

[11] Patent Number: 5,793,484
[45] Date of Patent: Aug. 11, 1998

[54] OPTICAL DEVICE FOR THE REMOTE MEASURING OF VARIATIONS IN THE ORIENTATION OF AN OBJECT

[76] Inventor: Jean-Marc Delassaux. 22. rue du Sentier des Coquins-F-95170. Deuil La Barre, France

[21] Appl. No.: 33,289

[22] Filed: Feb. 18, 1987

[30] Foreign Application Priority Data

Feb. 19, 1986 [FR] France ................ 86 02248

[51] Int. Cl.$^6$ ................ G01B 11/26
[52] U.S. Cl. ................ 356/152.3
[58] Field of Search ................ 356/4, 152, 152.3, 356/4.01; 350/102

[56] References Cited

U.S. PATENT DOCUMENTS

| | | | |
|---|---|---|---|
| 3,994,588 | 11/1976 | Marx | 356/152 |
| 4,315,690 | 2/1982 | Trocellier et al. | 356/152 |
| 4,425,043 | 1/1984 | van Rosmalen | 356/152 X |
| 4,470,664 | 9/1984 | Shirasawa | 356/152 X |
| 4,494,870 | 1/1985 | Hentschel et al. | 356/152 |
| 4,498,768 | 2/1985 | Holl | 356/152 X |
| 4,562,769 | 1/1986 | Heynau et al. | 356/152 X |
| 4,576,480 | 3/1986 | Travis | 356/152 |
| 4,582,428 | 4/1986 | Holl et al. | 356/152 |

*Primary Examiner*—Mark Hellner
*Attorney, Agent, or Firm*—Larson & Taylor

[57] ABSTRACT

A reflector for use in the remote measuring of variations in the orientation of an object with respect to a reference support. The reflector comprising at least one dihedron having reflecting surfaces at an angle which differs from 90 degrees by a small angle(beta), the intersection line of the surfaces being perpendicular to the direction of measurement.

8 Claims, 2 Drawing Sheets

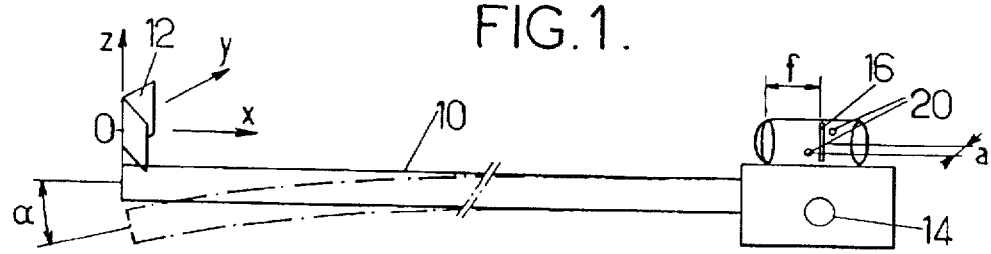
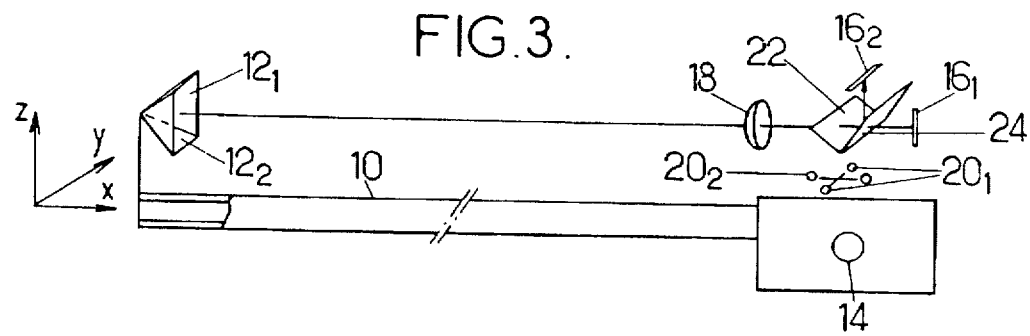
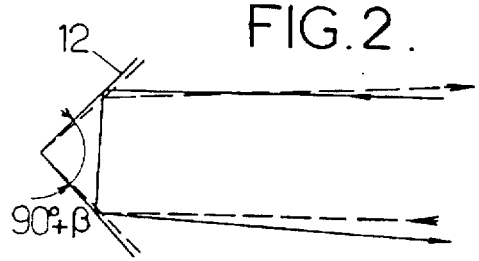
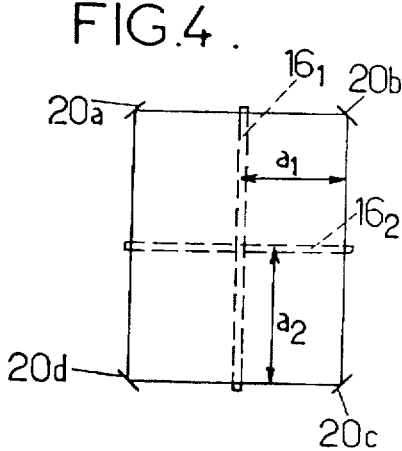
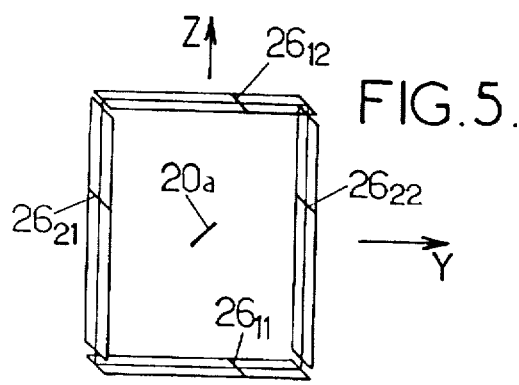
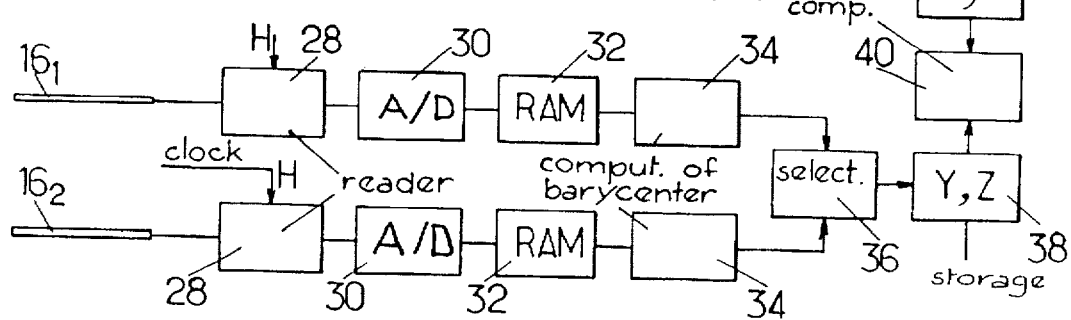

OPTICAL DEVICE FOR THE REMOTE MEASURING OF VARIATIONS IN THE ORIENTATION OF AN OBJECT

The subject of the invention is a device for the remote measuring of variations in the orientation of an object with respect to a reference support and it has an important application, though not exclusive, in the measurement of variations in a line of sight caused by the flexion of a tube (U.S. Pat. No. 4,383,474).

There are already known such measuring devices of the type comprising a reflector carried by the object and an assembly having a collimator light source and a detector carried by the reference support, at a location such that the variations in orientation cause the displacement of an image of the source on the detector. In particular, such devices have been produced for measuring the distortions in the chase of a gun. The assembly is mounted on the gun close to trunnions enabling the gun to be adjusted in elevation while the reflector is mounted on the chase in the immediate proximity of the mouth.

The existing devices give satisfactory results when the firing support is fixed. On the other hand, they are poorly suited for the measurement in the presence of vibrations when a large dynamic measurement range is required.

The invention is intended to provide a device capable of functioning in a vibratory environment, at a high measurement repetition rate and with an accuracy that is also high over a wide dynamic range of variation.

For this purpose, the invention in particular proposes a device of the type defined above, characterized in that, in order to measure the variations in orientation about a specified direction, the reflector comprises a dihedron whose edge is perpendicular to the said direction and whose peak angle differs from 90° by a small angle $\beta$ and the source includes at least one pulsed light emitter offset from the detector, in the said direction, by a distance $a=2f\beta$, where f is the focal length of the collimator.

The dihedron can in fact be formed by any reflecting device of the type frequently called 'invariant', of which the best known example is that formed by two reflecting surfaces at 90°, such as two silvered surfaces or two surfaces of a total reflection prism. In the second case, the distance a to be used according to the invention is $a=2nf\beta$, n being the index of the material forming the prism.

In general, two sources are placed symmetrically with respect to the detector in order to have a symmetrical field of detection. Consequently, the dihedron will provide a total of four images (two per source). The device can then be completed by means associated with the detector permitting the selection from the sources of the one for which a significant result is obtained when several images are formed on the detector.

The invention is of particular advantage when the device is intended for measuring the variations in orientation bout two directions orthogonal to each other. It then comprises two dihedrons whose edges are orthogonal, providing a total of four images of each source. The detector can be formed by one strip of sensors for each direction: the two strips having to be orthogonal and both having to be in the focal plane of the collimator, a light separator is placed behind the latter.

In the case of measurement in two perpendicular directions, it is advantageous to provide four light sources placed at the corners of a square or of a rectangle around the optical axis of the collimator. Means of control are provided for the sequential switching on of the four sources to prevent ambiguities which would be caused by the presence of sixteen simultaneous signals. When it is necessary to use a high measuring rate, the sources will generally be laser diodes.

The invention will be better understood on reading the following description of particular embodiments, given as non-limiting examples. The description refers to the accompanying drawings among which:

FIG. 1 is a basic diagram of a device for measuring variations in orientation of the end part of a tube, about a single direction;

FIG. 2 is a diagram showing the formation of two images by a quasi-invariant dihedron from an object source;

FIG. 3 is similar to FIG. 1 and is a diagram of a device permitting the measurement of the variations in orientation about two orthogonal directions;

FIGS. 4 and 5 show the various parameters which have an effect in the functioning of the device;

FIG. 6 is a block diagram of electronics which can be used in the device of FIG. 3.

Figure 7:
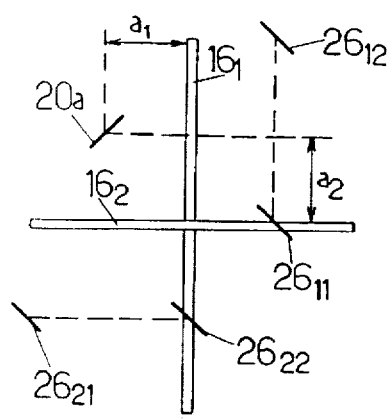
FIGS. 7 to 13 are diagrams showing the images formed on the detectors in several individual cases.

The device whose optical part is shown diagrammatically in FIG. 1 can be used for measuring the variations in orientation of the end part of the chase of a gun, for example mounted on an armoured vehicle. This device includes an assembly carried by a support which serves as a reference, generally the part of the gun directly supported by the turret, and a reflector mounted near the mouth of the gun on the chase 10.

The reflector is formed, in a way that is known in itself, by a dihedron 12 whose edge is placed along the direction z, which is vertical when the elevation aiming is zero. The dihedron is symmetrical with respect to the direction x, parallel to the axis of the chase.

The assembly carried by the reference support, placed in the immediate proximity of the trunnion 14 about which the weapon rotates during aiming in elevation, includes, in the illustrated embodiment, a detector 16 formed by a strip of photosensitive elements, for example a strip of photodiodes or charge couple detectors. The strip is mounted in such a way that, in the absence of flexion of the chase 10, it is parallel to the direction z and in the plane defined by Ox and Oz (O being the centre of the edge of the dihedron 12). The strip is located in the image plane of a collimator 18, of focal length f.

The assembly also includes, in the illustrated embodiment, two sources 20 placed symmetrically with respect to the strip 16, at a distance a from this strip, out of the bisecting plane of the dihedron.

Whilst the dihedrons used as backwards reflectors have an angle of 90° and provide a single image of a source, the dihedron 12 is provided in order to give, of each source 20, two images of which one is formed on the strip 16, at a distance from the centre of the strip which changes according to the orientation of the end part of the chase 10 about the direction y. In practice, the dihedron 12 is given an angle which differs from 90° by a small deviation $\beta$ (not exceeding a few degrees) chosen as a function of a and of f such that:

$$2f\beta=a$$

When the two surfaces of the dihedron are formed by the reflecting surfaces of a total reflection prism, this formula becomes:

$$2nf\beta=a$$

where n is the index of the material forming the prism.

The dihedron 12, which can be considered as a quasi-invariant, enables the source (or sources) 20 to be placed in an offset position from the strip in the focal plane and therefore gives two images of each source 20, offset by 4nf or 4nfβ in the focal plane, which contains the sources 20 and the detector. The two images move parallel to each other when the angle α between the end part of the chase 10 and its theoretical direction changes. One of the images of each source remains on the detector 16 and moves along this detector.

It is always certain that there will be one image on the detector, provided that the flexion does not exceed the value for which all the images of the sources have reached the edge of the strip constituting the detector.

FIG. 3 shows a device with four sources $20_1$ and $20_2$, which can be used when it is required to measure the variations in orientation about two orthogonal directions y and z. The device includes, in addition to the pair of sources $20_1$ having the same arrangement as those of FIG. 1, two sources $20_2$ aligned along an orthogonal direction. Each pair of sources is associated with the corresponding detector $16_1$ or $16_2$ from two detectors arranged orthogonally to each other.

In order for it to be possible to place the two detectors, formed by strips, in the focal place, the device of FIG. 3 includes two separating plates 22 and 24. The semitransparent plate 22 transmits the light emitted by the sources $20_1$, and $20_2$, by reflection, and, on return, allows part of the light to pass through towards the detectors $16_1$ and $16_2$. This transmitted light is divided into two sections by a second plate 24.

Another solution consists of using two different collimators on emission and on reception, such that the object focal plane and the image focal plane are offset with respect to each other in the direction x, which makes it possible to dispense with the plate 22.

The sources $20_1$ and $20_2$ can be arranged in a rectangle whose sides are parallel to the strips, as shown in FIG. 4. This arrangement increases the dynamic measurement range, as any deviation with respect to the centred position tends to bring closer to the centre 0 two of the four images of each of the sources, provided by the two quasi-invariant dihedrons $12_1$ and $12_2$. The use of four sources arranged in this way will generally be the best possible compromise, although this number can be reduced or increased, for example by using two sets of sources, the sources of one set being at the tops of a rectangle, and the others being in alignment with the first ones with respect to 0. When the sources are not point sources but of slit shape, they can be arranged as shown in FIG. 4 or otherwise, for example such that each source is in the form of a slit directed towards the centre 0.

As shown in FIG. 5, this arrangement provides four images of each source 20, such as 20a shown in FIG. 5, images which, when there is a change in orientation of the quasi-invariant dihedrons, are displaced in parallel and in pairs and parallel to the corresponding detectors. FIG. 5 diagrammatically represents the four images $26_{11}$, $26_{12}$, $26_{21}$ and $26_{22}$ corresponding to a given deflection of the tube 10. Because of the presence of four sources 20 having the arrangement shown in FIG. 4, it is certain that one image will be formed on each of the detectors $16_1$ and $16_2$.

In addition, the arrangement of FIG. 4 enables it to be certain that images, which do not overlap others, for at least one of the sources 20 will always be available.

The device can include a results analysis circuit, of the type shown in FIG. 6, associated with means, not shown, of successively switching on each of the four sources 20 in a repetitive cycle. These means can include a general clock H, a clock rate divider and a switching circuit at the output frequency of the divider. Each of the two strips is associated with a measuring branch which can be formed from a reader 28, activated at the rate of the clock H which also fixes the lighting frequency, an analog/digital converter 30 providing a digital value representing the illumination received by each sensitive element of the detector 16. All of the results provided by the converter are loaded into a buffer memory 32. After the strip has been scanned, the barycentre of each image can be determined by a computing circuit 34 if this image overlaps several sensitive elements. In this way there are obtained, for each cycle of illumination of the four sources in succession, data representing the position of the image in the Y and Z directions (FIG. 5).

A selection circuit 36 receives the data coming from the two branches and selects the most significant values (those for which the illuminated source forms an image on one or two strips $16_1$ and $16_2$) according to the criteria which will be described later. The values Y, Z are stored in 38 and a circuit 40 enables these values to be compared with values $Y_0$, $Z_0$ obtained by a harmonization process which can be standard and corresponding to the non-deflected state of the tube 10.

Such a device is particularly applicable to the measurement of distortions on the chase of a gun. It enables a measurement to be obtained, over a chase of several meters, with a resolution of the order of 30 micro-radians for movements of flexion which can be as much as 14 mils peak-to-peak. The measurement frequency can easily be as much as 500 Hz when the sources used are laser diodes providing light pulses of 200 nanoseconds with a repetition period of 10 milliseconds. When Ga—As laser diodes are used as sources and detectors 16 formed from "RETICON" strips of 256 elements in 25 micron steps are used, it is possible to group the elements which are in the proximity of the carriage inside a cylinder of a few millimeters diameter, with a collimator of focal length 250 mm. The device can also be adapted, but with a smaller dynamic measuring range, to the measurement of torsional distortions.

The invention is capable of having numerous variants and numerous applications other than that which has just been mentioned. In particular, it is applicable to any measurement of angle variation, for example for the purpose of determining changes in the position of lines of sight and those of a support arm. It also enables harmonizations of axes and stabilization residual measurements to be carried out.

There will now be given some representative examples of configurations of images in order to show how these configurations can be analyzed in order that a significant measurement can be obtained even in the case where several images are formed on a same strip.

It will be assumed that the device includes four sources 20a, 20b, 20c, 20d in the arrangement shown in FIG. 4.

The process of implementation initially involves a calibration stage, then the repetition of a measuring sequence. Both the calibration stage and the measurement sequence involve the lighting of a single source at a time and then proceeding with an acquisition on the two strips $16_1$ and $16_2$.

FIG. 7 shows the four images of the source 20a obtained when this source is lit while the tube has no flexion (angle α zero in the x0z plane and in the x0y plane). The image $26_{11}$ (one of the two images corresponding with detection in bearing or azimuth) and the image $26_{22}$ (one of the two images corresponding with detection in sight or elevation) respectively formed on strips $16_2$ and $16_1$. The reader 28 measures the output signals of the sensitive elements in succession, at the clock rate, and transmits them to the analog/digital converter 30. In a simplified embodiment, applicable when the image has dimensions of the same order as those of a sensitive element, the reader can comprise a single threshold element and provide a binary output. In this case, it suffices to store in memory the order number of the sensor (or of the adjacent sensors) for which the output signal indicates the presence of an image.

For purposes of simplification, only this latter case will be considered. The order number of the sensor receiving the image in the strip is all that is stored.

In the absence of distortion, the position of images $26_{11}$ and $26_{22}$ constitutes the reference position for the subsequent measurement of distortion. The other images are away from the strips and are not therefore taken into account. The same determination of reference positions is carried out for all the sources in order to perform a complete calibration.

Figure 8:
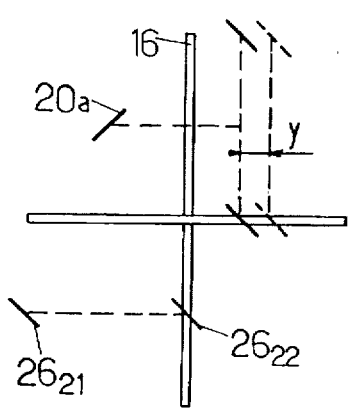

FIG. 8 shows the charge in position of the images of the source 20a when there is a distortion in azimuth only (i.e. in the y0z plane). In the case shown, the images $26_{11}$ and $26_{12}$ have been displaced to the left by a distance $y_a$ while the elevation images $26_{21}$ and $26_{22}$ have not moved. The order numbers of the new sensitive elements which are receiving the images are recorded.

The measurement is repeated for the other three sources. There is therefore obtained, for the measurement of distortion in azimuth, four values y. From this the angle of distortion in azimuth is derived proportional to:

$$\tfrac{1}{4}(y_a + y_b + y_c + y_d)$$

None of the measurements is subject to ambiguity as only a single image is formed on each strip.

Figure 9:
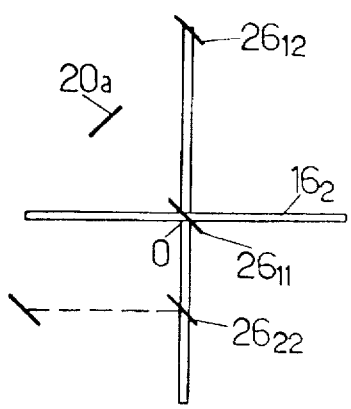

On the other hand, an ambiguity can appear if several images are formed on the same strip. It is often easy to remove. This is, for example, the case of FIG. 9 where the distortion in azimuth has an amplitude such that the image $26_{11}$ (and possibly also the image $26_{12}$) is formed on the strip $16_1$ as well as the image $26_{22}$.

It can be seen, however, that only image $26_{22}$ is likely to be formed below the crossover point 0. The selector 36, placed in the presence of two or three measurements, will therefore be able to select the image $26_{22}$ alone.

Figure 10:
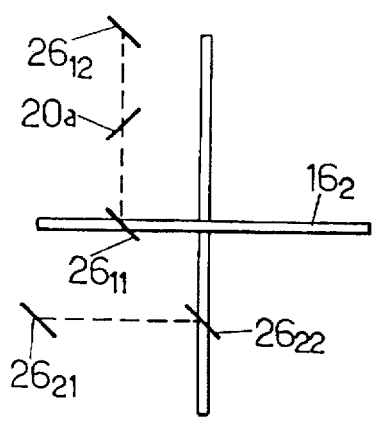
Figure 11:
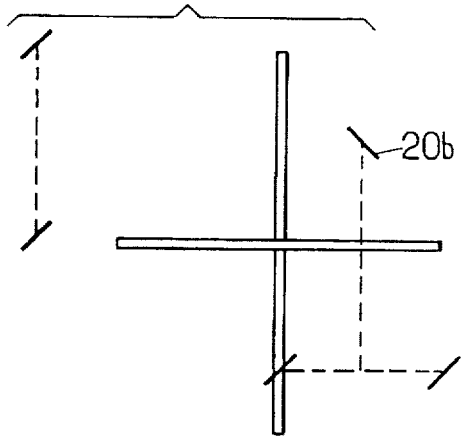

FIGS. 10 and 11 show the images of sources 20a and 20b when the distortion in azimuth has reached a value such that none of the images of one of the two sources (source 20b in this case) is formed any more on strip $16_2$. In this case, the azimuth measurement will be made using only the values of y found for the available images, i.e. those of sources 20a and 20d. It can be noted that no ambiguity is possible as it can be seen that, on the strip $16_2$, the images $26_{11}$ of the sources 20a and 20d are in positions where they alone can be formed.

It is then always possible to make a measurement by determination of the mean value of several detections.

Figure 12:
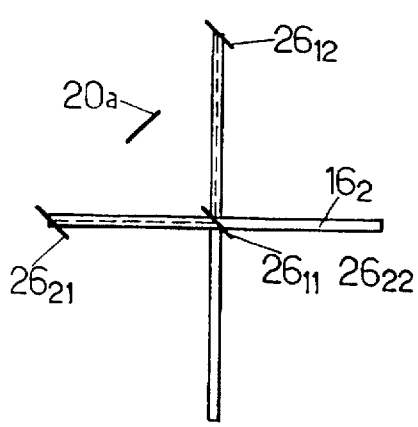
Figure 13:
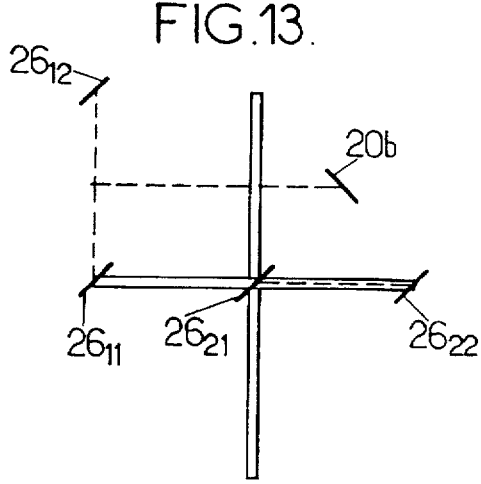

Finally, FIGS. 12 and 13 respectively show the images formed of sources 20a and 20b in the case in which the distortions in elevation and in azimuth are such that two images are formed at the intersection of the strips.

The ambiguity can still be removed using the same process as in the previous case. For example, image $26_{11}$ of source 20b is formed in an area where none of the other three images can be found. By successive elimination it is possible to determine the usable images and to determine the deviations this time by taking the average of the three measurements.

I claim:

1. Device for the remote measuring of variations in the orientation of an object with respect to a reference support, said device comprising a reflector carried by the object and a light source-detector assembly carried by the support at a location such that the said variations cause the displacement of an image of the source on the detector, characterized in that, in order to measure the variations in orientation about a specified direction, the reflector comprises at least one dihedron having reflecting surfaces at an angle which differs from 90° by a small angle $\beta$ and the imaginary intersection line of which is perpendicular to the said direction and the source includes at least one pulsed light emitter offset from the detector, in the said direction, by a distance $a=2f\beta$, where f is the focal length of a collimator arranged so as to form an image of said source on the detector.

2. Device according to claim 1, characterized in that two sources are placed symmetrically with respect to the detector.

3. Device according to claim 1, intended for measuring the variations in orientation about two specified orthogonal directions, characteried in that the device comprises two dihedrons having edges which are orthogonal to each other for providing a total of four images of each source and two said detectors.

4. Device according to claim 3, characterized in that the device comprises four light sources arranged at the corners of a square or of a rectangle around the optical axis of the collimator.

5. Device according to claim 4, characterized in that the device includes means for the sequential switching on of the four sources.

6. Device according to claim 4, characterized in that means are provided for selection of the measurement corresponding to the sources providing images on each of the two detectors.

7. Device according to claim 3, characterized in that the device comprises a single collimator and light separating means enabling the two detectors to be placed, in the form of crossed strips, in the focal plane of the collimator.

8. Device according to claim 1, characterized in that the detector is formed by a strip of photodiodes and in that the source is formed by a laser diode.

* * * * *